US005879518A

United States Patent [19]

Kuehnle

[11] Patent Number: 5,879,518

[45] Date of Patent: Mar. 9, 1999

[54] METHOD AND APPARATUS FOR PRODUCING SMALL PARTICLES OF CONSISTENT SIZE SHAPE AND STRUCTURE

[76] Inventor: Manfred R. Kuehnle, P.O. Box 1020, New London, N.H. 03257

[21] Appl. No.: 827,232

[22] Filed: Mar. 28, 1997

[51] Int. Cl.[6] ..... B01J 19/08

[52] U.S. Cl. ..... 204/164; 204/178; 422/186.22; 422/186.26; 422/186.27

[58] Field of Search ..... 204/164, 178; 422/186.22, 186.26, 186.27, 906

[56] References Cited

U.S. PATENT DOCUMENTS

| | | | |
|---|---|---|---|
| 3,101,308 | 8/1963 | Sherr et al. | 422/186.26 |
| 5,207,999 | 5/1993 | Burk et al. | 423/258 |
| 5,211,995 | 5/1993 | Kuehnle et al. | 427/570 |
| 5,227,038 | 7/1993 | Smalley et al. | 204/173 |
| 5,318,628 | 6/1994 | Matijevic et al. | 106/499 |
| 5,344,889 | 9/1994 | Matijevic et al. | 106/442 |
| 5,573,732 | 11/1996 | Waggener et al. | 422/907 |

*Primary Examiner*—Kishor Mayekar

*Attorney, Agent, or Firm*—Cesari and McKenna, LLP

[57] ABSTRACT

Small particles are produced by supporting a pair of elongated consumable electrodes coaxially in a housing so that corresponding ends of the electrodes are spaced apart across a gap. A potential difference is applied to the electrodes so that an arc ignited in the gap between the electrode ends gasifies the electrode material at the end. The gas is then cooled so that the gas condenses into small droplets which solidify into solid particles which are collected at a collection site.

16 Claims, 4 Drawing Sheets

METHOD AND APPARATUS FOR PRODUCING SMALL PARTICLES OF CONSISTENT SIZE SHAPE AND STRUCTURE

FIELD OF THE INVENTION

This invention relates to a method for producing small particles, e.g., nanoparticles, which have consistent size, shape, structure and functionality. It also relates to apparatus for making such particles.

BACKGROUND OF THE INVENTION

There are various known methods for producing fine particles and particularly for producing nanosize inorganic powders. Such particles and powders are used in diverse product applications such as thickeners for house paint, the manufacture of sintered parts such as valve seats for automobile engines, etc.

The prevalent processes for producing such small particles include flame-spraying, spark discharge, chemical precipitation, atomization and gas disassociation-collision-coalescence techniques. These known methods are disadvantaged in that they provide only limited control over the size, shape, structure and chemical composition of the resulting particles and powders. Therefore, for the most part, the prior powders have been relegated to the mundane uses described above; they have not been used to any great extent in more sophisticated applications such as in resonant optical filters, inorganic color pigments, ultra whiteners, catalytic agents, etc., where precise control over the size, structure and composition of the particles is of paramount importance.

Prior powder production techniques are disadvantaged also because they consume a relatively large amount of energy. Therefore, they are not suitable for high volume powder production where low cost is an important consideration.

SUMMARY OF THE INVENTION

Accordingly, it is an object of the present invention to provide apparatus for producing nanosize inorganic particles of consistent size, shape and composition.

A further object is to provide such apparatus which utilizes a minimum amount of energy.

Another object is to provide apparatus of this type which experiences tight control over the process parameters.

Still another object is to provide such apparatus which optimizes the production of particles of the desired size.

Another object of the invention is to provide apparatus which has a high rate of powder production.

Yet another object of the invention is to provide a process for making fine powders having one or more of the above advantages.

Other objects will, in part, be obvious and will, in part, appear hereinafter.

The invention accordingly comprises the several steps and the relation of one or more of said steps with respect to each of the others, and the apparatus embodying the features of construction, combination of elements and arrangement of parts which will be exemplified in the following detailed description, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

DETAILED DESCRIPTION OF PREFERRED EMBODIMENT

Figure 1:
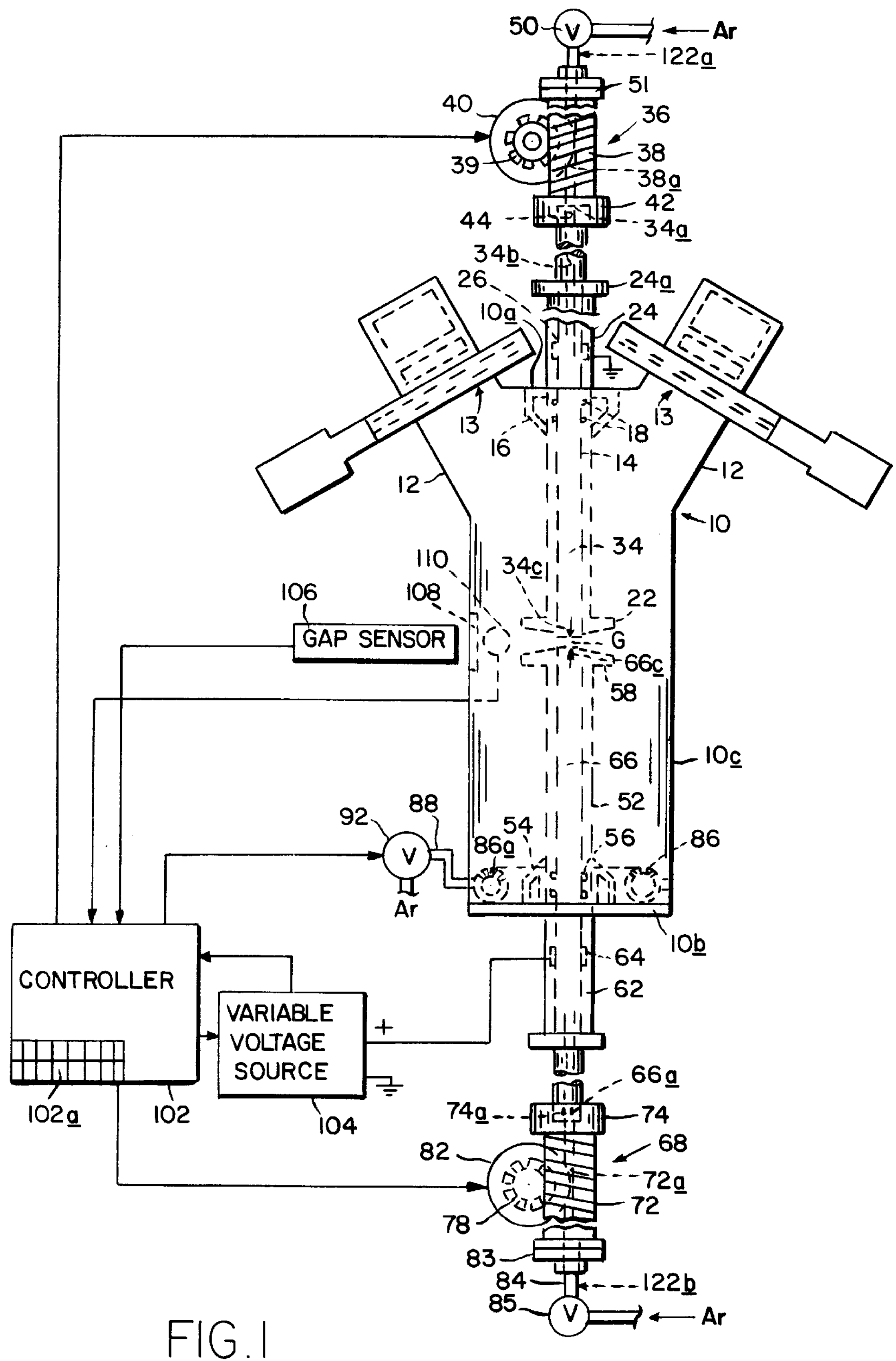
FIG. 1 is an elevational view with parts shown diagrammatically of apparatus for making fine particles according to the invention.
Figure 2:
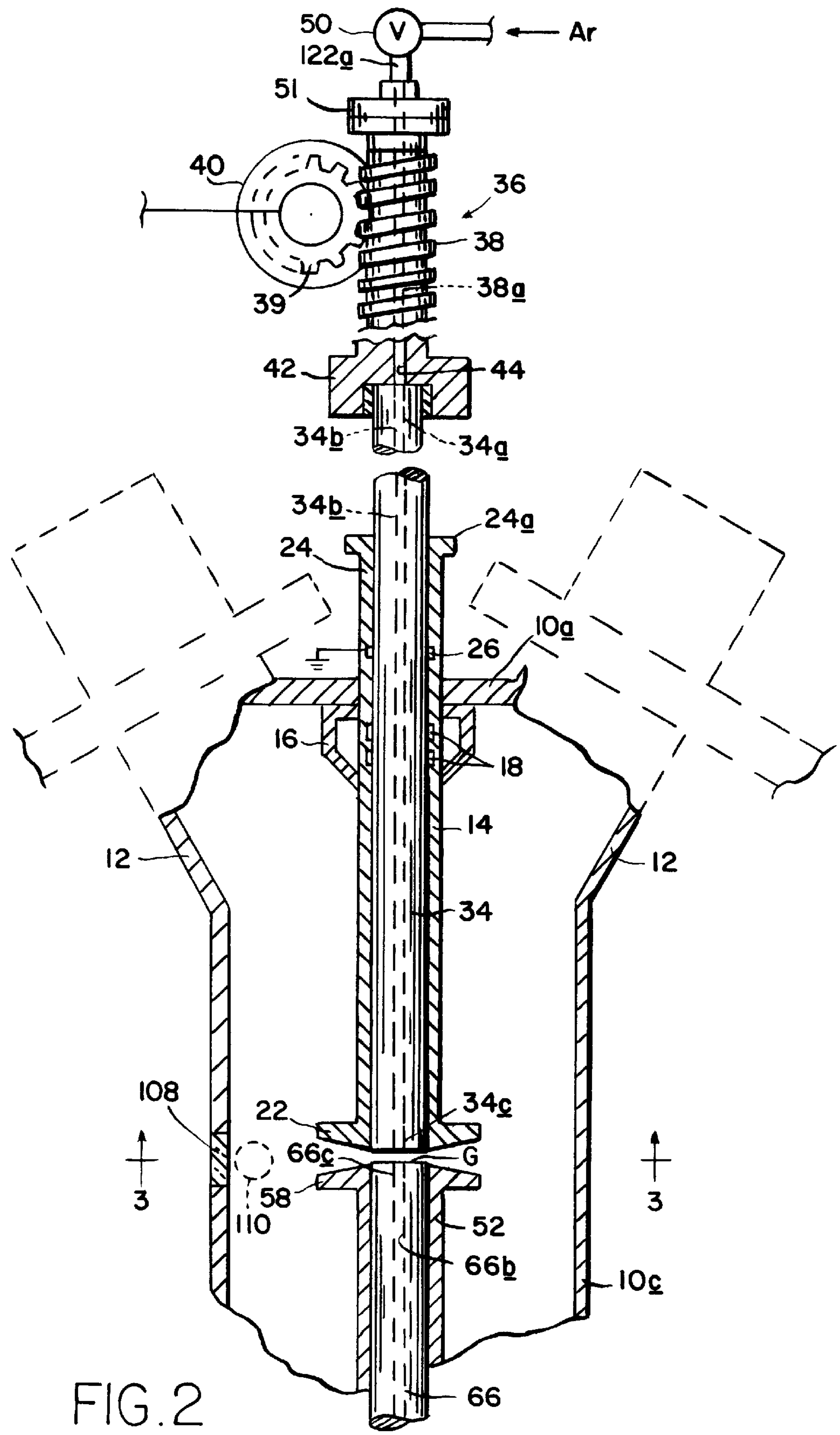
FIG. 2 is a fragmentary vertical sectional view on a larger scale showing a portion of the FIG. 1 apparatus in greater detail.

Referring to FIGS. 1 and 2 of the drawings, my apparatus comprises a generally cylindrical housing 10 made of a high temperature resistant ceramic material such as molybdenum or vanadium steel. Housing 10 has a top wall 10*a*, a bottom wall 10*b* and a side wall 10*c* which is more or less cylindrical except that it has one or more cylindrical extensions 12 which extend upwardly-outwardly at the top of the housing. Each extension contains a cold trap 13 whose function will be described later. The illustrated apparatus has two such extensions 12. However, another apparatus may have several such extensions distributed around the vertical axis of the housing in a single funnel-shaped structure.

Extending down from the housing top wall 10*a* is a cylindrical sleeve 14 which should also be of a material able to withstand high temperatures. Preferably also, the sleeve 14 should be electrically non-conducting, e.g., of sintered quartz powder. The upper end of sleeve 14 where it joins top wall 10*a* is reinforced by a plurality of radially extending struts 16 and one or more annular seals 18 are provided in the interior wall of sleeve 14 opposite struts 16 for reasons that will become apparent. The lower end of sleeve 14 is terminated by a reinforcing, heated, collet 22.

A second sleeve 24 which may be an extension of sleeve 14 extends up from the housing top wall 10*a*, the upper end of that sleeve being formed with a radial flange 24*a*. Present at the interior surface of sleeve 24 just above housing wall 10*a* is a ring electrode 26 which is connected to a voltage source in a manner to be described.

The function of sleeves 14 and 24 is to snugly, but slidably, support a tubular electrode 34 constituted by the prime constituent of the particles to be formed by the apparatus and which is consumed during operation of the apparatus. For example, if silicon nanoparticles are being produced, electrode 34 may be made by sintering in an inert gas atmosphere, silicon particulates so that the electrode 34 has the proper diameter, density and length to fit the sleeves 14 and 24.

As best seen in FIG. 2, the electrode 34 is frictionally engaged by the sleeves 14 and 24, as well as by the seals 18 and the ring electrode 26 within the sleeves so that it does not tend to slip within the sleeves. However, the electrode may be moved up and down by a feed mechanism shown generally at 36 positioned above housing 10. The feed mechanism 36 may comprise a tubular lead screw 38 whose upper end may be rotated by a gear 39 rotated by a step motor 40. The lower end of that screw is terminated by an annular gripping collar 42 which can be engaged tightly about the upper end 34*a* of electrode 34. Collar 42 has an axial opening 44 which establishes fluid communication between the axial passage 38*a* of lead screw 38 and axial passage 34*b* in electrode 34. Preferably, the gripping collar 42 is of an insulating material to electrically isolate the feed mechanism 36 from the electrode 34. The feed mechanism normally maintains the lower end 34*c* of electrode 34 just below the collet 22.

An electric flow control valve 50 controls the flow of gas from the source of an inert gas such as argon (Ar) through a rotary coupling 51 into the upper end of lead screw 38.

Referring to FIG. 1, the apparatus also includes an electrode and electrode support and feed structure at the bottom of housing 10 which is essentially the mirror image of the one at the top of the housing. More particularly, a sleeve 52 extends up from the housing bottom wall 10*b*, that sleeve being collinear with sleeve 14. The lower end of sleeve 52 is provided with reinforcing struts 54 and seals 56. The upper end of the sleeve 52 is terminated by a heated collet 58 which is spaced from collet 22. A collinear sleeve 62 extends down from housing wall 10*b* and contains a ring electrode 64 similar to ring electrode 26 described above.

Sleeves 52 and 62 support a tubular electrode 66 which is similar to electrode 34 and that electrode 66 is moved within the associated sleeves by a feed mechanism shown generally at 68. Mechanism 68 includes a tubular lead screw 72 terminated by a gripping collar 74 which engages the lower end 66*a* of electrode 66. The collar 74 includes an axial opening 74*a* to allow gas to pass from the axial passage 72*a* of lead screw 72 into the axial passage 66*b* of electrode 66. The lead screw 72 and electrode 66 are moved up and down by means of a gear 78 which may be rotated by a step motor 82. The mechanism 68 normally positions the upper end 66*c* of electrode 66 above collet 58 and spaced a small distance from the lower end 34*c* of the upper electrode 34.

The lower end of the lead screw 72 is connected via a rotary coupling 83 to a conduit 84 leading to a source of primary gas such as argon, with the gas flow being controlled by an electrical flow control valve 85.

Also provided at the lower end of the housing 10 interior is a toroidal manifold 86 having a multiplicity of openings 86*a* distributed around its upper surface. A cold inert gas such as argon may be supplied to the manifold 86 by means of a pipe 88 leading from the gas supply, with the gas flow being controlled by an electrical flow regulator 92.

The step motors 40 and 82 are controlled by output signals from a controller 102. The controller also provides control signals for the valves 50, 85 and 92. In addition, the controller 102 provides control signals to a variable voltage source 104 connected to the ring electrodes 26 and 64 so that a selected DC potential is maintained between the ring electrodes and therefore between the opposing ends of the rod electrodes 34 and 66.

Controller 102 receives input signals from an optical sensor 106 which measures the size of the gap G between the opposing electrode ends 34*c* and 66*c*. If necessary, a suitable window 108 may be provided in the side wall 10*c* of the housing for this purpose. The controller also receives signals from an optical density sensor 110 positioned in housing 10 opposite gap G. The sensor 110 looks along a chord in the housing. It is able to detect the average number of particles in its viewing window and sends corresponding electrical signals to controller 102. In addition, the controller 102 also receives feedback signals from voltage source 104 which enable the controller to maintain a substantially constant current in the rod electrodes 34 and 66.

During the operation of the FIG. 1 apparatus, instructions are provided to controller 102 via its keyboard 102*a* causing the controller to open valves 50 and 85 so that primary gas, i.e. Ar, flows through the electrodes 34 and 66 and into the gap G where the gas spills out radially into the interior of housing 10. Controller 102 also opens valve 92 so that cold inert gas issues upwardly from manifold 86 and forms an annular curtain 114 of cold gas which flows upwardly just inside the housing side wall 10*c* as shown by the upstreaming arrows in FIG. 4.

Next, an electric arc is ignited between electrode ends 34*c* and 66*c*. For this, the controller 102 controls the step motors 48 and 82 in response to signals from the gap sensor. It also controls the current flowing through the electrodes so as to produce an arc between electrode ends 34*a* and 66*c* and to maintain a substantially constant energy flow between the electrodes so that the electrode material at gap G vaporizes at a substantially steady level. In other words, the controller advances the electrodes 34 and 66 toward one another as the material at the electrode ends 34*c* in 66*c* is consumed by the vaporization process.

To help maintain a steady state energy flow, it is desirable to rotate at least one of the electrodes 34, 66 to prevent localized excess heating and melt "splatter" at gap G. In the present apparatus, since the electrodes are advanced by lead screws 38 and 72, the electrodes are automatically rotated as they are advanced toward one another by their step motors 40 and 82, respectively. Localized overheating of the electrode ends at gap G is also inhibited by the relatively large area collets 22 and 58 which are cooled by the upflowing gas stream 114.

Figure 5:
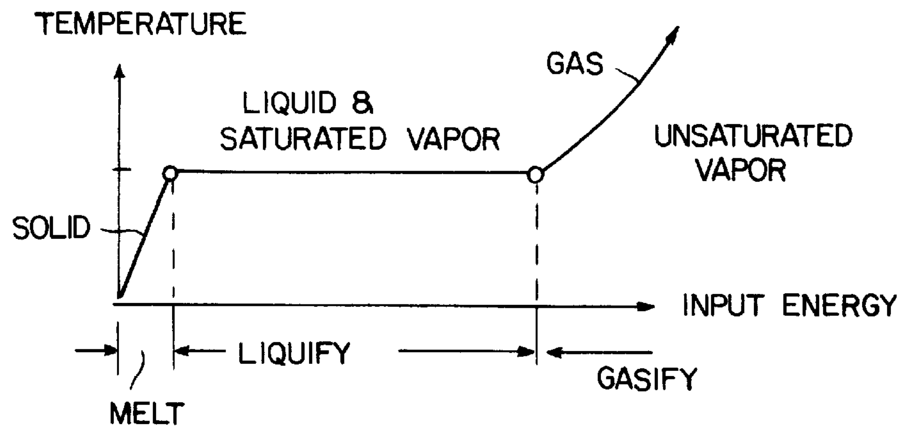
FIG. 5 is a diagram showing the variation of temperature with input energy when the FIG. 1 apparatus is in operation.

The electric arc developed between the electrodes at gap G first liquefies, then vaporizes, and finally gasifies the electrode material, i.e., silicon in the example. This process is illustrated in FIG. 5 which is an energy-phase diagram for the electrode material. FIG. 5 shows that a certain amount of energy is necessary to convert the solid material into a liquid. A substantially larger amount of input energy, corresponding to the latent heat of the vaporization of the material, is needed to vaporize the liquid. Thereafter, additional energy is needed to convert the vapor into unsaturated vapor or gas.

Figure 4:
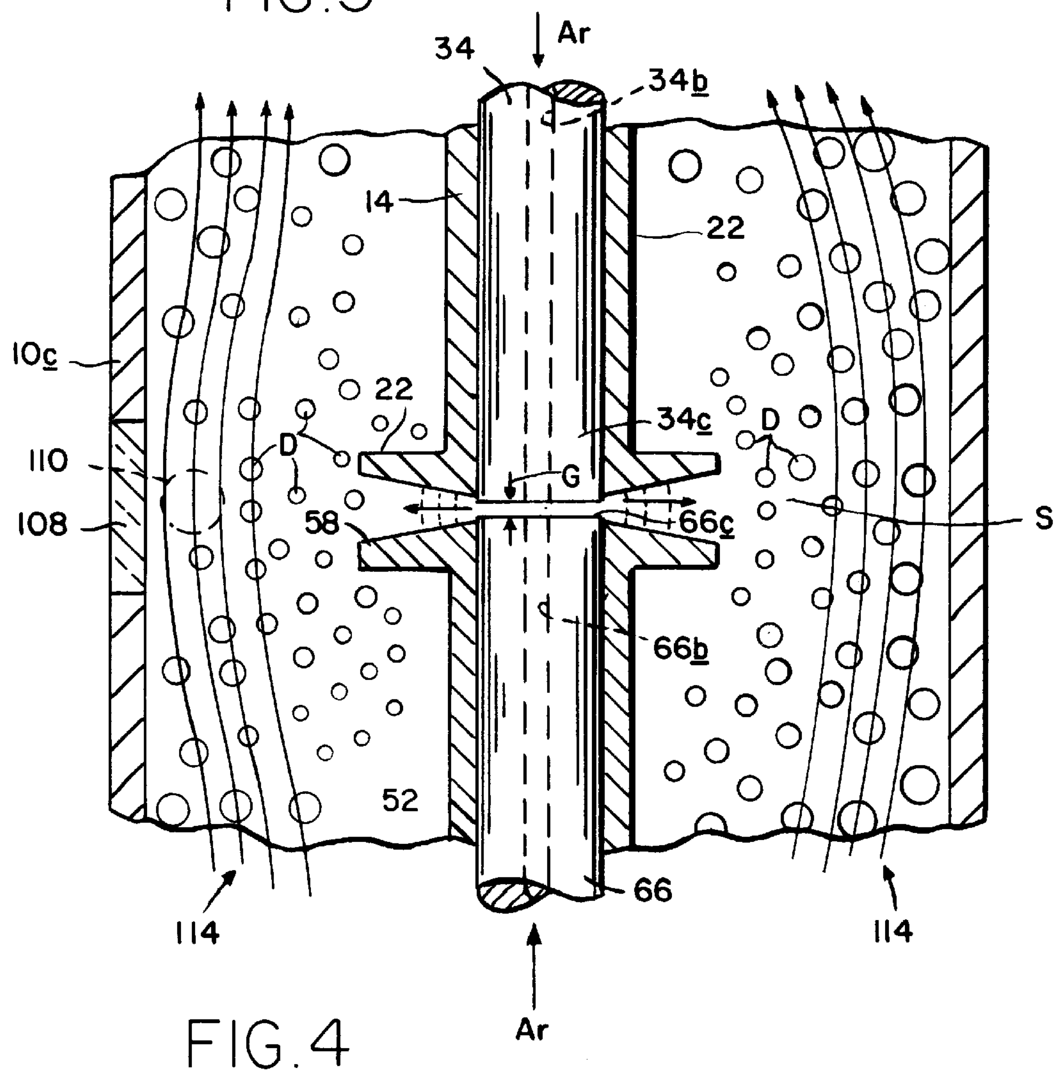
FIG. 4 is a view similar to FIG. 2 on a still larger scale showing the FIG. 1 apparatus in operation.

As shown in FIG. 4, once vaporized, the electrode material is under pressure and seeks to expand into the annular space S around the gap G. Normally, as a natural part of the expansion under pressure, the molecular vapor particles cluster together and the clusters collide with other particle clusters to form tiny droplets D that, through additional collisions, coalesce and grow in size to bring about larger liquid droplets. Thus, there is a graduation in the size of the particles in the annular space S with the smallest particles being located closest to gap G and the largest particles being situated radially outward in spaces adjacent to the housing outer wall 10*c*. Depending upon the frequency of these collisions and the rate of cooling before the vaporized electrode material resolidifies, the statistical spread or distribution of the droplet/particle size can range either widely or narrowly depending on the geometric and energetic conditions within the housing 10.

Thus, in accordance with one aspect of the invention, the illustrated apparatus features an annular space S surrounding gap G into which the vapor can expand while loosing thermal energy by adiabatic cooling as the droplets coalesce to a predominantly narrow size. Upon reaching the radially outer portions of the annular space S near the housing side wall 10*c*, the droplets are subjected to a sudden temperature drop as they are swept up in the cold, relatively dense annular or stream curtain 114 of cold argon gas which instantly solidifies the droplets and sweeps them upwardly into housing extensions 12 where they are collected at the cold traps 13 therein. As shown in FIG. 4, this annular gas stream has a certain radial breadth that allows larger particles to travel further into the gas stream 114 than smaller particles which possess less kinetic energy, which smaller particles may only reach the inner boundary of the gas stream. This radial particle size distribution in the annular gas stream 114 enables the apparatus to provide a particle size differentiation or separation as the particles are being collected at the cold traps 13 in housing extensions 12.

Figure 3:
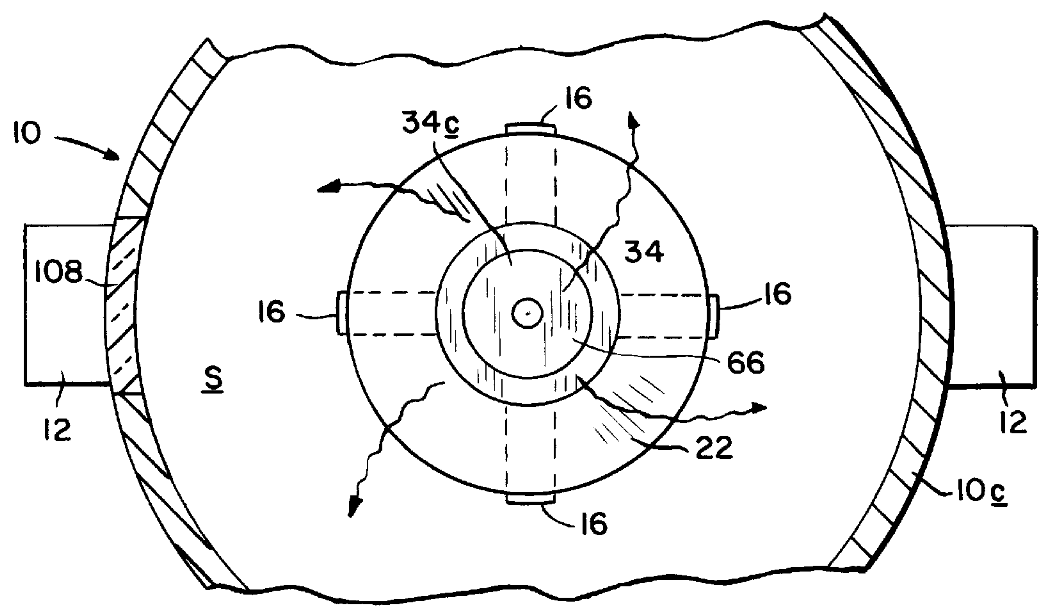
FIG. 3 is a sectional view taken along line 3—3 of FIG. 2.

Another aspect of the invention which is particularly important to the particle size separation capabilities of the apparatus is the presence of the pressurized inert gas delivered to gap G through the passage 34*b* and 66*b* in electrodes 34 and 66, respectively. This gas, argon in the illustrated example, propels the nascent droplets produced at gap G omnidirectionally toward the perimeter of space S at many times the speed of their natural thermal expansion velocities, projecting the heavier particles further into the gas stream 114. As shown in FIG. 3, the internal gas from the electrodes also disperses the vapor circumferentially, as shown by the curved arrows, thus enabling the growth of smaller nanoparticles as their trajectories become extended during the microsecond time frame available for coalescence before they reach the cold gas stream 114 and solidify. Resultantly, the apparatus produces a narrower distribution of particle sizes and achieves temperature control within narrow, adjustable tolerances over the thermal profile shown in FIG. 5.

Figure 6A:
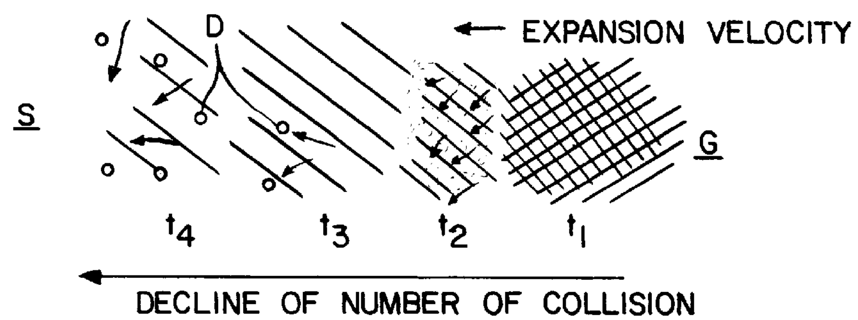
FIGS. 6A and 6B are diagrammatic views illustrating the operation of the FIG. 1 apparatus.
Figure 6B:
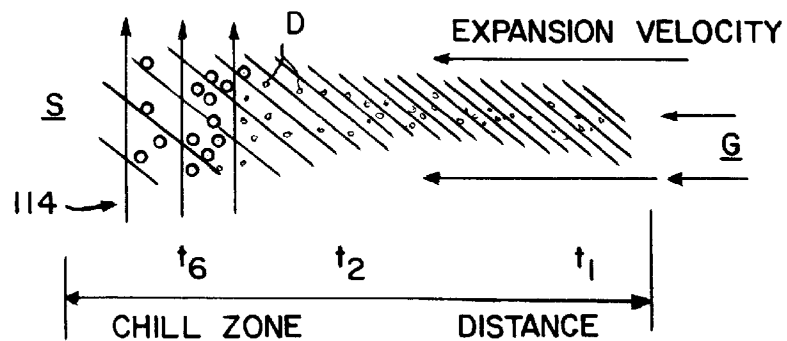

A comparison of FIGS. 6A and 6B illustrate the effect of delivering a primary gas into the gap G between the electrodes. FIG. 6A shows the natural expansion and coalescence of the vapor droplets as they travel outwardly into space S under adiabatic expansion conditions (i.e., without the primary gas flow through the electrodes) and without the cooling effect of the gas curtain 114. As seen from FIG. 6A, there are a large number of droplet collisions in the region close to gap G and a decline in the number of aggregations and collisions as the droplets travel outward into space S and solidify into particles over time. Resultantly, a relatively wide range of particle sizes is produced and many of the particles are relatively large. As shown in FIG. 6B, on the other hand, when primary gas is delivered through the electrodes to gap G to propel the droplets radially outward into the cold gas stream 114, the vapor droplets have less time to collide and coalesce before being solidified by the gas stream 114. Therefore, the particles produced by the apparatus and collected at the cold traps 13 are smaller and have a relatively narrow size distribution.

It should be noted that since the gas delivered to gap G has to flow through the electrodes 34 and 66, it is preheated and, therefore, does not solidify the droplets prematurely. It does, however, facilitate control over the temperature of the electrodes within relatively narrow adjustable tolerances. This factor also helps to produce a steady energy transfer at the gap G.

As the vaporization process proceeds, the opposing ends 34*c* and 66*c* of the electrodes 34 and 66, respectively are consumed so that the gap G becomes wider. The gap increase is detected by the gap sensor 106 which delivers a signal to controller 102 causing the controller to actuate the step motors 40 and 82 to advance the electrodes to maintain a selected gap width. The controller also receives the electrode current-indicating feedback signal from source 104 and develops a control signal for the source so as to maintain substantially constant current at the gap G. The number and size of the particles produced by the vaporization process is monitored by the optical density sensor 110 which provides a signal to the controller 102 so that the controller can control the gap width, gas flow and electrode current to optimize the production of particles with the desired size distribution.

In some applications, it may be desirable to add a dopant to the particles produced by the apparatus. This may be done easily by injecting a dopant gas into the gas stream entering the lead screws 38 and 72 as indicated in phantom at 122*a* and 122*b* in FIG. 1. The gas molecules will be carried into gap G by the primary gas and combine with the silicon vapor from electrodes 34 and 66 before the vapor particles solidify. For example, if it desired to dope the particles with carbon, the dopant gas may be silicon carbide.

As the vaporization process proceeds and the electrodes 34 and 66 become excessively short, fresh electrodes can be introduced simply by releasing the collars 42 and 74 from the ends of the electrodes being consumed, retracting the lead screws 38 and 72 sufficiently to permit the fresh electrodes to be inserted behind the ones being consumed and engaging the collars 42 and 72 to the ends of the new electrodes. Thus, electrodes can be fed into the apparatus continuously to resupply the arc zone at gap G with new material.

The electrodes 34 and 66 may be fabricated by sintering a hot pressing of the elemental powder material, e.g., silicon, zirconium or hafnium in an inert gas atmosphere to form hollow rods having the desired diameter, density and length. For example, a typical rod may be in the order of 40 inches long, 2 inches in diameter and have a density of 95% of its theoretical density. As the sintered rods approach the arc zone at gap G, they become gradually pre-warmed to eliminate any residual stresses and strains that were introduced into the electrodes during the fabrication process.

With an electrode feed rate of about 50 cm/hr, the described apparatus should be able to produce as much as 10 kg of nano-particles per hour.

As noted previously, the particles produced by the apparatus are swept upwards by the cold air stream 114 into the housing extensions 12 where they are collected at the cold traps 13 therein. The cold traps are standard items of manufacture. A suitable one is available from Leybold Hanau as a prestage to the cryopumps. Basically, the cold trap consists of a series of ring-like, internally hollow, angularly (45°) placed rings that are cooled by liquid nitrogen(-80° C.). Any gas that streams through them into the cryopumps (-270° C.) is prevented by said cold traps from back streaming into the main chamber.

It will thus be seen that the objects set forth above, among those made apparent from the preceding description are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

What is claimed is:

1. A method of producing small particles comprising the steps of supporting a pair of elongated consumable electrodes coaxially in a housing so that corresponding ends of the electrodes are spaced apart across a gap;

providing an annular housing space around the gap and electrode ends;

applying a potential difference to the electrodes so that an arc is ignited in the gap between the electrode ends that gasifies the electrode material at said ends which condenses to form droplets traveling radically through said space a distance proportional to the size of the droplets to provide a radial size distribution of the droplets in the housing, and directing a cooling gas stream into radially outer confines of said space substantially perpendicular to the direction of travel of the droplets to cool and solidify the radially outer droplets and direct them to a collection site as electrode material particles having a selected size distribution.

2. The method defined in claim 1 and further including feeding the electrodes toward one another along said axis as the electrode material is consumed.

3. The method defined in claim 2 including the additional step of rotating at least one of the electrodes about said axis.

4. The method defined in claim 2 and further including sensing the width of the gap, and controlling the feeding to maintain the width of the gap at a substantially constant value.

5. The method defined in claim 1 at least one of and further including feeding an insert gas into said gap through said electrodes to propel the gasified electrode material out of the gap.

6. The method defined in claim 1 and further including controlling the potential difference and the gap width to maintain a substantially constant energy flow between the electrodes.

7. Apparatus for producing small particles comprising a housing;

a pair of elongated consumable electrodes, each electrode having an end;

means for supporting the electrodes in said housing on a common axis so that their ends oppose one another across a narrow gap having opposite sides, said housing defining an annular space around said gap and electrode ends;

means for applying a potential difference to the electrodes to ignite an arc in the gap between the electrode ends which gasifies the electrode material at said ends to form droplets traveling radially through said space a distance proportional to the size of droplets to provide a radial size distribution of the droplets in the housing;

cooling means in the housing at one side of the gap for directing a cooling gas stream into radially outer confines of said annular space substantially parallel to said axis for cooling the droplets into solid particles, and collection means in the housing at the opposite side of the gap for collecting the solid particles.

8. The apparatus defined in claim 7 and further including means for feeding the electrodes toward one another along said axis as the electrode material is consumed.

9. The apparatus defined in claim 8 wherein the feeding means includes rotation means for rotating at least one of the electrodes about said axis.

10. The apparatus defined in claim 8 and further including sensing means for sensing the width of the gap, and control means for controlling the feeding means to maintain the width of the gap at a substantially constant value.

11. The apparatus defined in claim 7 wherein at least one of the electrodes has a lengthwise passage extending to its end, and further including means for feeding a gas to said passage so that the gas issues from the electrode end into said gap.

12. The apparatus defined in claim 11 wherein the gas is an inert gas.

13. The apparatus defined in claim 7 wherein the collection means include one or more cold traps.

14. The apparatus defined in claim 7 wherein the cooling means comprise an annular gas inlet positioned in the housing substantially concentric to said axis, and means for flowing a cooling gas to said gas inlet.

15. The apparatus defined in claim 14 wherein the electrodes are of silicon and the cooling gas is an inert gas.

16. The apparatus defined in claim 10 wherein the control means include means for regulating the voltage and the gap width to maintain a substantially constant energy flow between the electrodes.

* * * * *